United States Patent [19]

Sarangdhar et al.

[11] Patent Number: 5,568,620

[45] Date of Patent: Oct. 22, 1996

[54] METHOD AND APPARATUS FOR PERFORMING BUS TRANSACTIONS IN A COMPUTER SYSTEM

[75] Inventors: Nitin V. Sarangdhar, Beaverton; Konrad K. Lai, Aloha; Gurbir Singh, Portland, all of Oreg.

[73] Assignee: Intel Corporation, Santa Clara, Calif.

[21] Appl. No.: 85,541

[22] Filed: Jun. 30, 1993

[51] Int. Cl.[6] .................................................. G06F 3/00
[52] U.S. Cl. ......................................... 395/285; 395/292
[58] Field of Search .................................. 395/425, 400, 395/325, 285, 292, 200.14; 364/940.81

[56] References Cited

U.S. PATENT DOCUMENTS

| | | | |
|---|---|---|---|
| 4,181,974 | 1/1980 | Lemay et al. | 395/200.01 |
| 4,488,232 | 12/1984 | Swaney et al. | 395/200.06 |
| 4,841,436 | 6/1989 | Asano et al. | 395/250 |
| 5,006,982 | 4/1991 | Ebersole et al. | 395/736 |
| 5,197,137 | 3/1993 | Kumar et al. | 395/375 |
| 5,235,684 | 8/1993 | Becker et al. | 395/280 |

OTHER PUBLICATIONS

Popescu, Val; Schultz, Merle; Spracklen, John; Gibson, Gary; Lightner, Bruce; Isaman, David, "The Metaflow Architecture", IEEE Micro, Jun. 1991, page Nos. 10–13 and 63–73.

*Primary Examiner*—Jack A. Lane
*Attorney, Agent, or Firm*—Blakely, Sokoloff, Taylor & Zafman

[57] ABSTRACT

A method and apparatus of performing bus transactions on the external bus of the computer system. The present invention includes a method and apparatus for permitting out-of-order replies in a pipelined bus system. The out-of-order responses include the sending of tokens between both the requesting agents and the responding agents in the computer system without the use of dedicated token buses.

33 Claims, 8 Drawing Sheets

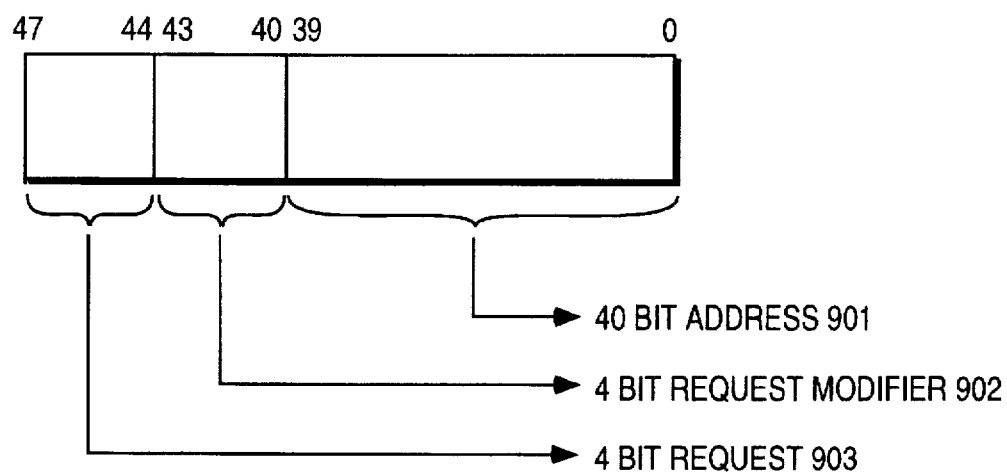

METHOD AND APPARATUS FOR PERFORMING BUS TRANSACTIONS IN A COMPUTER SYSTEM

FIELD OF THE INVENTION

The invention relates to the field of protocols for computer system buses; particularly, the present invention relates to protocols for buses that perform split/deferred/out-of-order transactions.

BACKGROUND OF THE INVENTION

In a computer system, transfers between devices such as processors, memories, input/output (I/O)) units and other peripherals generally occur according to a protocol. These devices are commonly referred to as agents. The protocol is a method of handshaking that occurs between the devices during a transfer which allows each device involved in the transfer to know how the other device is going to act or perform.

Typically, transfers of data and information in a computer system are performed using multiple buses. These buses may be dedicated buses between only two devices or non-dedicated buses that are used by a number of units, bus agents or devices. Moreover, buses in the system may be dedicated to transferring a specific type of information. For instance, an address bus is used to transfer addresses, while a data bus is used to transfer data.

A bus transaction normally includes a requesting device, or agent, requesting data or a completion signal from another agent on the bus. The request usually includes some number of control signals indicating the type of request accompanied by the address of the desired data or the desired device. The device which is mapped into the address space containing the requested address responds by sending a completion signal along with any data as necessary.

In some computer systems, bus transactions occur in a pipelined manner. When bus transactions are pipelined, the requests from numerous bus agents are pending at the same time. This is possible due to the fact that separate data and address buses are used. In a pipelined transaction, while an address of a request is being sent on the address bus, the data or signals corresponding to a previously requested address (on the address bus) may be returned on the data bus. For example, if three requests are sent on the address bus, three responses occur on the data bus. In certain pipelined systems, the completion responses occur in the same order as they were requested. However, in other pipelined systems, the order of the completion responses does not have to occur in the same order as their corresponding requests. This type of bus system is commonly referred to as a split transaction bus system.

In split transaction buses, a bus transaction begins by initiating a request to one of the agents in the computer system. The response corresponding to the request is disassociated from the request completely. When the response is ready, the response initiates itself, thereby returning to the requesting agent in some manner. In one embodiment, the requests are tabbed so that they may be identified by the requesting agent upon their return.

In prior art computer systems, to accommodate split transactions, the systems require some capability of associating a data response with its address (i.e., its request). Typically, two separate token buses are used. When performing a request, an address is driven onto the address bus. At the same time, a token is driven on the first token bus. This token is associated with the address request. The token is received by the agent which is to respond to the address request (i.e., the responding agent). When the responding agent is ready to respond, the responding agent drives data, if necessary, onto the data bus. At the same time, the responding agent drives the same token on the second token bus. The requesting agent recognizes the token as the one that was associated with its original request, and in response, latches the data or signals to complete the bus transaction. Thus, in the prior art, a separate token bus is associated with the request path and another token bus is associated with the response path of a bus transaction.

Using two token buses increases the number of pins that are required to interface with the external bus. Prior art token buses normally are 8-bits in width. Therefore, using two separate token buses requires an additional sixteen pins to be added to the computer system, as well as additional space allocated on the computer board for the token buses. Moreover, the pins used to support the token buses must also be added to every bus agent package in the system. Thus, the cost of every package in the system increases. On the other hand, in a multi-processor system, the increase in bandwidth due to permitting split transactions is significant due to the ability to reorder long latency transactions behind short latency transactions issued later. It is desirable to reduce the cost of an integrated circuit chip package by reducing the number of pins required, yet still accommodate a split transaction bus arrangement.

The present invention provides a method and apparatus for implementing such a bus protocol. The protocol of the present invention provides a method and apparatus for accommodating split transactions across the external computer bus without the use of separate token buses and without an increased number of pins associated with them.

SUMMARY OF THE INVENTION

A method and apparatus for performing bus transactions in a computer system is described. The computer system includes separate data and address buses that allows bus transactions to occur in a pipelined manner. The present invention includes a method and apparatus for driving an address on the address bus. The address is driven by a device, or agent, such that the address becomes one of an ordered series of addresses on the address bus. The present invention also includes a method and apparatus for driving a first token on the data bus in response to the address when the response/data corresponding to the address request is not available. The token is driven on the bus at such time that the series of responses corresponding to the series of address requests remains in the same order as that of the series of address requests. The requesting device receives the first token and stores it internally.

When the data is ready, the responding device drives a second token on the address bus. Also the responding device drives any necessary data onto the data bus which corresponds to the original address request. The requesting device receives the second token and compares the second token to the first token corresponding to its previous address request. Upon determining that a match exists, the requesting device receives the data from the data bus, thereby completing the bus transaction.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 9 illustrates one embodiment of a token which uses the address of the request as part of the token.

FIG. 10 illustrates one embodiment of the transaction pending queue in the responding agent.

DETAILED DESCRIPTION OF THE INVENTION

A method and apparatus for accommodating split transactions in a computer system is described. In the following detailed description of the present invention numerous specific details are set forth, such as token size, queue size, etc., in order to provide a thorough understanding of the present invention. However, it will be obvious to one skilled in the art that the present invention may be practiced without these specific details. In other instances well known methods, functions, components and procedures have not been described in detail as not to unnecessarily obscure the present invention.

Overview of the Computer System of the Present Invention

Figure 1:
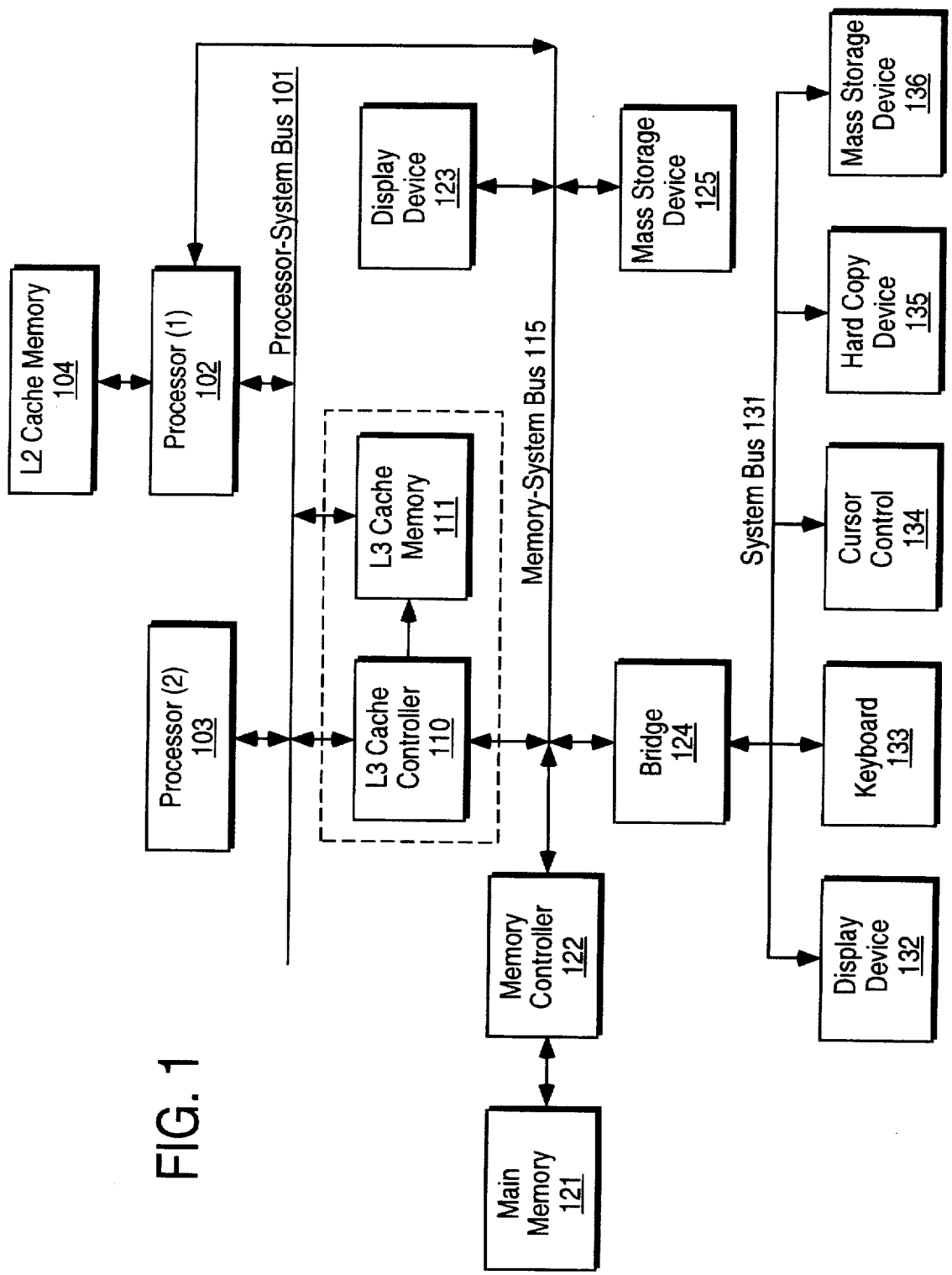
FIG. 1 is a block diagram of one embodiment of the computer system of the present invention.

Referring first to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment.

As illustrated in FIG. 1, a computer system, as may be utilized by the preferred embodiment of the present invention, generally comprises of a processor-system bus or other communication means 101 for communicating information and a processor 102 coupled with processor-system bus 101 for processing information. In the present invention, processor-system bus 101 includes address, data and control buses. In the currently preferred embodiment, processor 102 includes an internal cache memory, commonly referred to as a level one (L1) cache memory for temporarily storing data and instructions on-chip. A level two (L2) cache memory 104 is coupled to processor 102 for temporarily storing data and instructions for use by processor 102. In the currently preferred embodiment, cache memory 104 is included in the same chip package as processor 102.

Also coupled to processor-system bus 101 is processor 103 for processing information in conjunction with processor 102. Processor 103 may comprise a parallel processor, such as a processor similar to or the same as processor 102, or may comprise a co-processor, such as a digital signal processor. A level three (L3) cache memory 111 for temporarily storing data and instructions for use by other devices in the computer system (e.g., processor 102, processor 103, etc.) and a L3 cache controller 110 for controlling access to L3 cache memory 111 may also be coupled to processor-system bus 101. The L3 cache controller 110 is also coupled to memory-system bus 115.

A memory-system bus or other communication means 115 for communicating information is coupled to processor 102 for providing processor 102 and other devices in the computer system access to the memory and input/output (I/O) subsystems. A memory controller 122 is coupled with memory-system bus 115 for controlling access to a random access memory (RAM) or other dynamic storage device 121 (commonly referred to as a main memory) for storing information and instructions for processor 102 (and processor 103). A mass data storage device 125, such as a magnetic disk and disk drive, for storing information and instructions, and a display device 123, such as a cathode ray tube (CRT), liquid crystal display (LCD), etc., for displaying information to the computer user are coupled to memory-system bus 115.

An input/output (I/O) bridge 124 is coupled to memory-system bus 115 and I/O bus 131 to provide a communication path or gateway for devices on either memory-system bus 115 or I/O bus 131 to access or transfer data between devices on the other bus. Specifically, bridge 124 turns the byte/word/dword data transfer traffic from I/O bus 131 into line size traffic on memory-system bus 115.

I/O bus 131 communicates information between devices in the computer system. Devices that may be coupled to system bus 131 include a display device 132, such as a cathode ray tube, liquid crystal display, etc., an alphanumeric input device 133 including alphanumeric and other keys, etc., for communicating information and command selections to other devices in the computer system (e.g., processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to system bus 131.

Of course, certain implementations and uses of the present invention may not require nor include all of the above components. For example, in certain implementations, the L3 cache controller and L3 cache memory may not be required. In such implementations processors (102) and (103) will reside directly on a memory system bus 115. In other implementations, it may not be required to provide a display device for displaying information. Certain implementations of the present invention may include other components.

Bus Protocol of the Present Invention

The devices and units in the computer system of the present invention represent both requesting agents and responding agents. A requesting agent is a device which is capable of requesting an operation that involves receipt of data or a completion signal from another device. A responding agent is a device which is capable of responding to the request by sending data or the necessary signals in response to the operation/request. Note that in the following description, the terms "agent" and "device" may be used interchangeably.

In the present invention, bus transactions occur on the buses in the computer system in a pipelined manner. That is, multiple bus transactions may be pending at the same time, wherein each is not fully completed. Therefore, when a requesting agent begins a bus transaction by driving an address onto the address bus, the bus transaction may only be one of a number of bus transactions currently pending. Although bus transactions are pipelined, the bus transactions in the present invention do not have to be fully completed in order, such that the present invention performs split bus transactions. Therefore, the present invention allows for completion replies to requests to be out-of-order.

The present invention accommodates for split transactions by essentially splitting a bus transaction into two independent transactions. The first transaction involves a request for data (or completion signals) by a requesting agent and a response by the responding agent. The request may be comprised of the sending of an address on the address bus. The response may include the sending of the requested data (or completion signals) if the responding agent is ready to respond. In this case, the bus transaction ends. However, if the responding agent is not ready to supply the request (i.e., the data or completion signals), the response may include the sending of a token. In this case, the second transaction comprises the resending of the token with the requested data (or completion signals) by the responding agent to the requesting agent, such that the requesting agent receives the originally requested data to complete the transaction. A bus transaction according to the present invention is depicted in the flow chart of FIG. 2.

Figure 2:
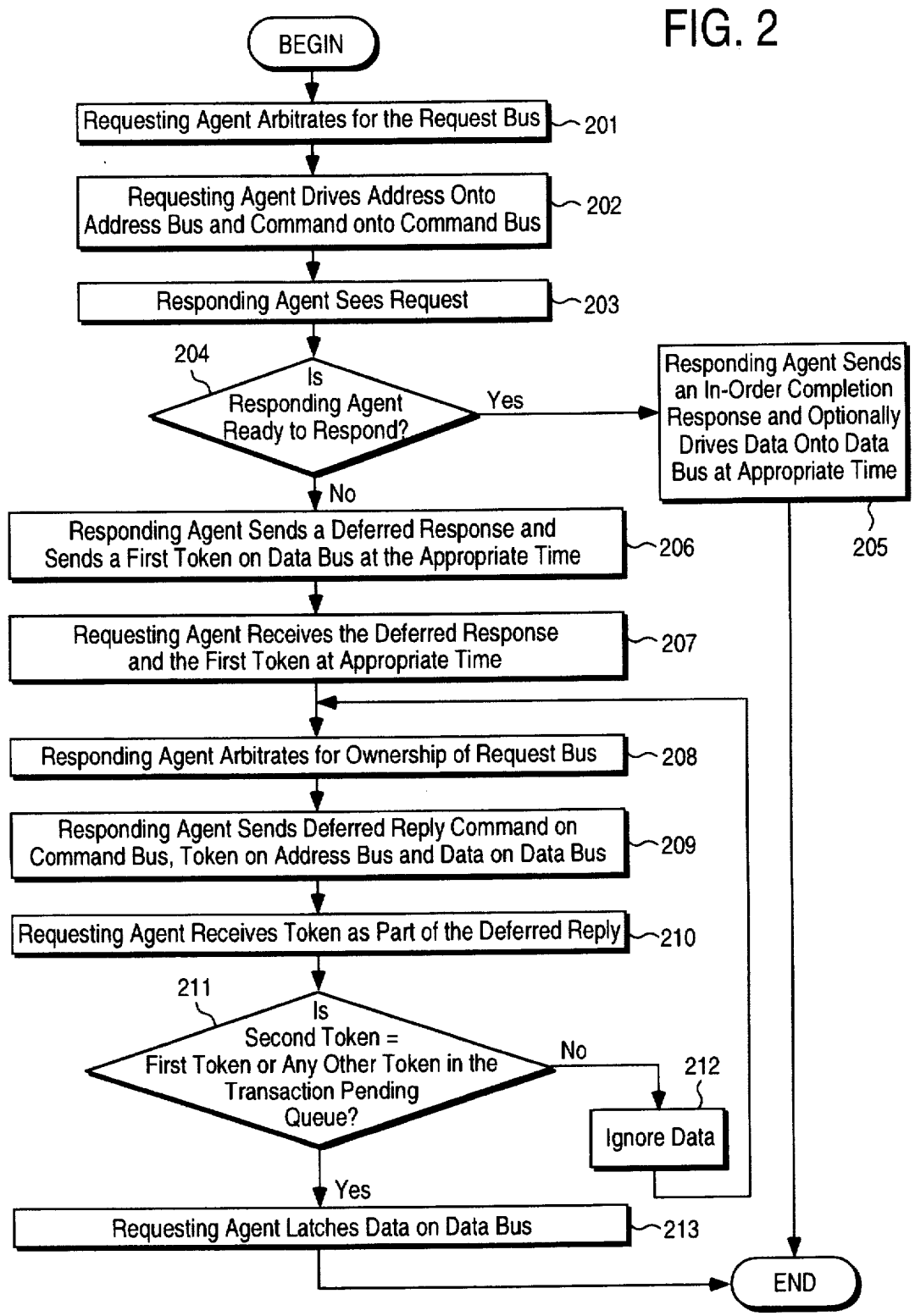
FIG. 2 is a flow diagram of a bus cycle according to the present invention.

Referring to FIG. 2, a bus transaction begins when a requesting agent arbitrates for ownership of the request bus (processing block 201 ). In the present invention, the requesting agent arbitrates for the address/byte enables and command buses. Upon winning the arbitration, the requesting agent drives a request in the form of an address onto the address bus (processing block 201) in a manner well-known in the art.

Once a request has been placed onto the bus, a determination of which device is to be the responding agent occurs (processing block 203). This determination includes recognizing the address that was driven onto the address bus by a responding agent. In one embodiment, the responding agent is the device which is mapped into the address space that includes the address of the request.

The responding agent then determines if it is ready to respond (processing block 204). In one embodiment, the responding agent is ready to respond if the data requested is available. If the data is available, then the responding device sends an "in-order" completion response indication and drives the data or necessary signals on the data bus at the appropriate time (processing block 205), thereby ending the bus transaction.

If the responding agent is not ready to complete the bus transaction (e.g., if the data is not ready by the time the responding agent is required to respond), then the responding agent sends a deferred response and drives a first token onto the data bus at its appropriate response time (processing block 206).

The requesting agent receives the deferred response and the first token (processing block 207). The deferred response and the first token are received by latching the information from the system bus at the appropriate time. The appropriate time is dictated by the pipelined nature of the system bus. Because the responses are pipelined, the requesting agents are able to latch the data corresponding to their request from the data bus at the correct time. The token is stored in a queue, referred to as a transaction pending, or suspended, queue, with an indication of the request with which it is associated.

A number of additional transactions may be run on the bus after the requesting agent receives the deferred response and its associated token before the responding agent is able to satisfy the request. When the responding agent is ready to complete the deferred bus transaction (e.g., the data does become available to the responding agent), the responding agent arbitrates for ownership of the request bus (processing block 208).

Once request bus ownership has been granted to the responding agent, the responding agent sends a deferred reply (processing block 209). The deferred reply includes a second token being sent on the address bus deferred reply command on the command bus and the response/data being driven on the response/data bus. In the currently preferred embodiment, the second token is the same as the first token.

The requesting agent monitors the address bus and receives the token as part of the deferred reply (processing block 210). In the present invention, the requesting agent latches the second token. The requesting agent then determines whether the second token sent from the responding agent matches the first token (processing block 211). The requesting agent performs a token match between the second token sent from the responding agent and the first token, or any other token in the requesting agent's transaction pending queue. It should be noted that in the present invention, the requesting agent is always monitoring the address bus for addresses and tokens and constantly compares the signals on the address bus to determine if the signals represents an address within the address range mapped to the agent or if the signals represent a token.

If the requesting agent determines that second token from the responding agent does not match the first token, then the data on the data bus (or the completion signal) is ignored (processing block 212) and the requesting agent continues monitoring the address bus (processing continues waiting at processing block 208). If the requesting agent determines that second token from the responding agent does match the first token, then the data on the data bus (or the completion signals) is the data originally requested by the requesting agent and the requesting agent latches the data on the data bus (processing block 213). After receiving the data corresponding to the original request, the entire bus operation ends. Thus, a transfer of data takes place from the responding agent to the requesting agent and the original request transaction is retired.

During a bus transaction depicted in FIG. 2, the determination of which device is to be the responding agent involves identifying if the new request creates a conflict with any of the requests which are currently being deferred in the transaction pending queue.

After a device has been determined to be the responding agent, the responding agent is responsible for generating a response to ensure that bus retains its pipelined nature. A responding agent may not be able to complete the requested bus transaction at the appropriate times. For example, the data requested may not be available. The data may not be available for numerous reasons. For example, the data may not be available due to long access times of a particular device. For instance, due to the structure or the nature of a particular device, the preparation of a response to satisfy the request may require a large number of cycles to complete. This normally in and of itself would not be a problem. However, since the system bus of the present invention is pipelined, a device which requires longer period of time to prepare a response (e.g., to obtain the necessary data) may not be able to respond in the time set for its response to ensure that the responses on the data bus remain in order. If the responding agent cannot complete the requested bus transaction at the appropriate times, the responding agent sends a deferred response and a token. Therefore, the responding agent sends either the requested data or completion signals (if ready to respond) or a deferred completion consisting of a deferred response and a token (if unable to supply the requested data) at the appropriate time.

The appropriate time for a responding agent to generate a response is defined as that time at which the responding agent may respond in order to retain the order of the responses on the data bus with those requests that occur on the address bus, thereby ensuring the pipelined nature of the system bus of the present invention. To ensure that the bus remains pipelined, the order of the responses on the data bus must occur in the same order as their associated requests on the address bus. Therefore, a response to a particular request must appear on the data bus after the response of the request which immediately preceded the particular request on the address bus. If some type of response is not made, then all of the subsequent responses will be stalled by the agents responsible for generating them, hurting system performance.

The responding agent upon completing the bus cycle with a deferred response must be capable of designating the later available data with a particular request if the responding agent is to be able to accommodate multiple requests while one or more requests are pending. For example, when data is requested from the cache memory (e.g., L3 cache memory) and the cache controller sends a deferred response, if the cache memory is to be accessed while this transaction is pending, the responding agent (i.e., the cache controller) must include a mechanism to match the data that becomes available to the request which requested it. In one embodiment, the responding agents include a queue which is used to store the token sent for a deferred response and its associated request. Therefore, when the data is available, the responding agent knows the destination of the data.

The token sent by the responding agent with the deferred response is latched by the requesting agent and is used by the requesting agent as a future reference. When the requesting agent latches the token and receives the deferred response, hardware within the requesting agent determines that the data received from the data bus is a token. The token is then stored in a queue with an indication of the request with which it was associated. When the responding agent is ready to complete the bus transaction, the same token used when sending the deferred response is sent on the address bus. In one embodiment, a special command is used to indicate to agents on the bus that the address bus has a token instead of an address. Associated with the special command is the data (on the data bus) that was originally requested by the requesting agent. In this manner, the subsequently sent token re-establishes contact with the requesting agent.

Bus Transactions in the Currently Preferred Embodiment

In the currently preferred embodiment, the bus includes two major subsidiary buses: a request bus and a data bus. The request bus is used by the initiator of a request (i.e., a requesting agent) to transfer the request type and address. The same bus is used by observers of the request to transfer their status or response for the issued transaction. The data bus transfers data being read or written. During bus operation, these two buses are treated as separate resources with separate arbitration for each. It should be noted that the request bus includes the address bus.

In the currently preferred embodiment, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions. A transaction is the set of bus activities related to a single request, from request bus arbitration through response-initiated data transfers on the data bus. In the currently preferred embodiment, a transaction is the set of bus activities related to a single request, from request bus arbitration through response-initiated data transfers on the data bus.

A transaction contains up to seven distinct phases. However, certain phases are optional based on the transaction and response type. A phase uses a particular signal group to communicate a particular type of information. Five of the seven phases are associated with the request bus. These phases are called request/response phases:

Request Arbitration Phase

Request Transfer Phase

Request Error Phase

Snoop Result Phase

Response Phase

The remaining two phases are associated with the data bus and are called data phases:

Data Arbitration Phase

Data Transfer Phase

In the currently preferred embodiment, the data phases are optional and used if a transaction transfers data on the data bus. The data phases are request-initiated, if the data is available at the time of initiating the request (e.g., for a write transaction). The data phases are response-initiated, if the data is available at the time of generating the transaction response (e.g., for a read transaction). A transaction may contain both a request-initiated data transfer and a response-initiated data transfer.

Figure 3:
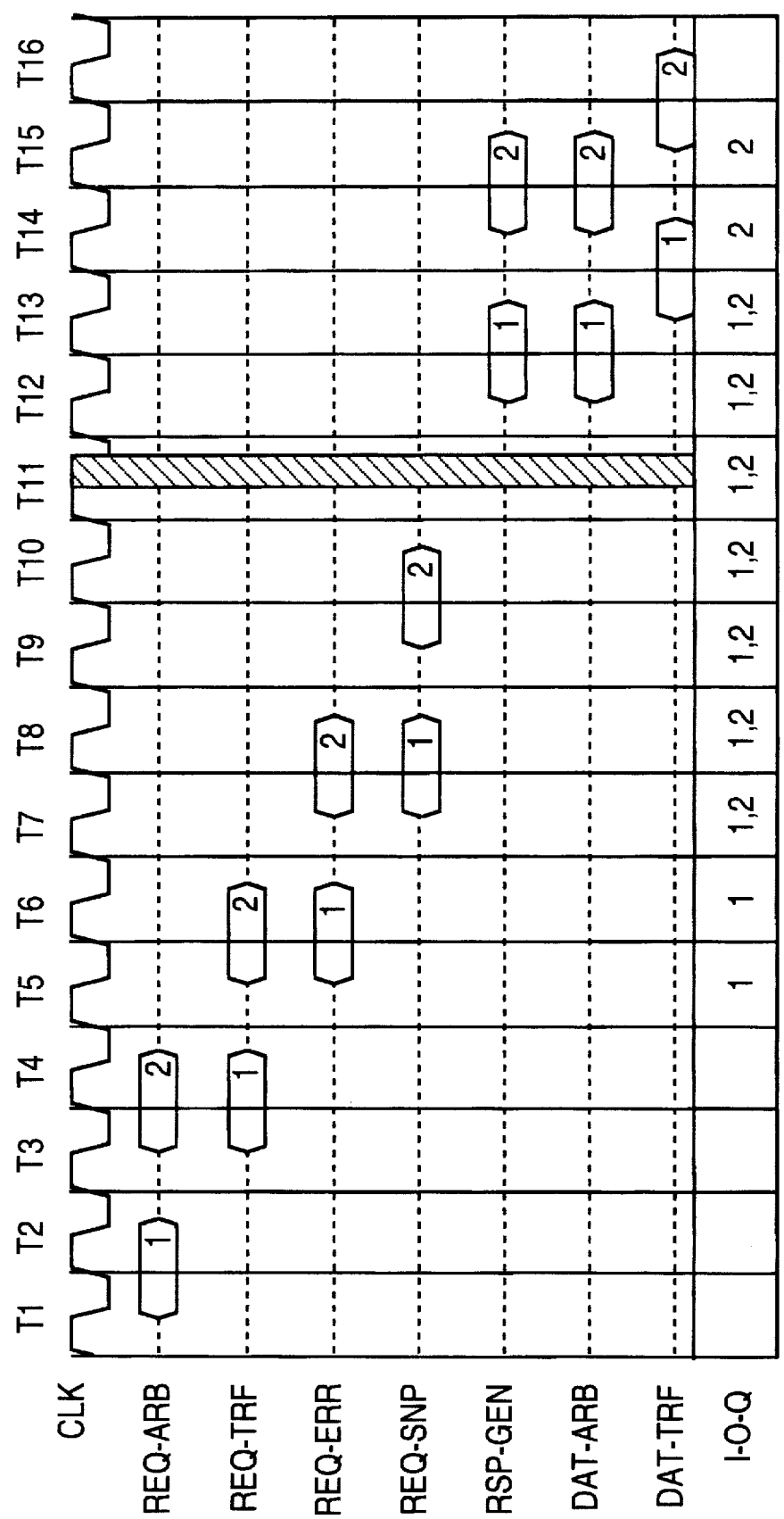
FIG. 3 is a timing diagram of a bus transaction in the currently preferred embodiment.

Different phases from different transactions can overlap, thereby pipelining bus usage and improving bus performance. FIG. 3 shows overlapped request/response phases for two transactions. Referring to FIG. 3, every transaction begins with a Request Arbitration Phase (REQ-ARB) on the request bus, in which a requesting agent becomes the request bus owner. The second phase on the request bus is the Request Transfer Phase (REQ-TRF) in which the bus owner drives a request and address information on the request bus. After the Request Transfer Phase, a new transaction enters a first-in-first-out (FIFO) queue, the In-Order Queue (I-0-Q in FIG. 3). All bus agents, including the requesting agent, maintain identical In-Order Queues and add each new request to those queues. In FIG. 3 for example, request 1 is driven in T3, observed in T4, and in the In-Order beginning in T5. The third phase of a transaction is a Request Error Phase (REQ-ERR), two or more cycles after the Request Transfer Phase. The Request Error Phase indicates any immediate errors triggered by the request. The fourth phase of a transaction is a Snoop Result Phase (REQ-SNP), four or more cycles from the Request Transfer Phase. The Snoop Result Phase indicates if the cache line accessed in a transaction is valid or modified (dirty) in any agent's cache. The Snoop Result Phase also indicates whether a transaction will be completed in-order to may be deferred for possible out-of-order completion.

Transactions proceed through the In-Order Queue in FIFO order. The topmost transaction in the In-Order Queue enters the Response Phase. The Response Phase (RSP-TRF) indicates whether the transaction failed or succeeded, whether the response is immediate or deferred, and whether the transaction includes data phases.

If a transaction contains a response-initiated data phase, then it enters data arbitration (DAT-ARB) along with the response phase, the transaction is removed from the In-Order Queue at the completion of its Response Phase and (an optional) response-initiated data arbitration phase. As shown in FIG. 3, transaction 1 is removed for IOQ effective in T14. The response initiated Data Transfer Phase (DAT-TRF) begins at the completion of the data arbitration phase.

Deferred Operations

If a responding agent is unable to guarantee in-order completion of a transaction, the responding agent asserts a DEFER# signal in the transaction's Snoop Result Phase to indicate that the transaction may be deferred or aborted. If the DEFER# signal is not overridden by another caching agent asserting the HITM# signal (indicating a hit to the cache) in the Snoop Result Phase, then the address-decoded agent owns the transaction response. The response of the responding agent is determined by its deferred reply policy. If the responding agent is capable of completing the transaction in a deferred mode and then generate a deferred reply, then it should generate a deferred response.

Figure 4:
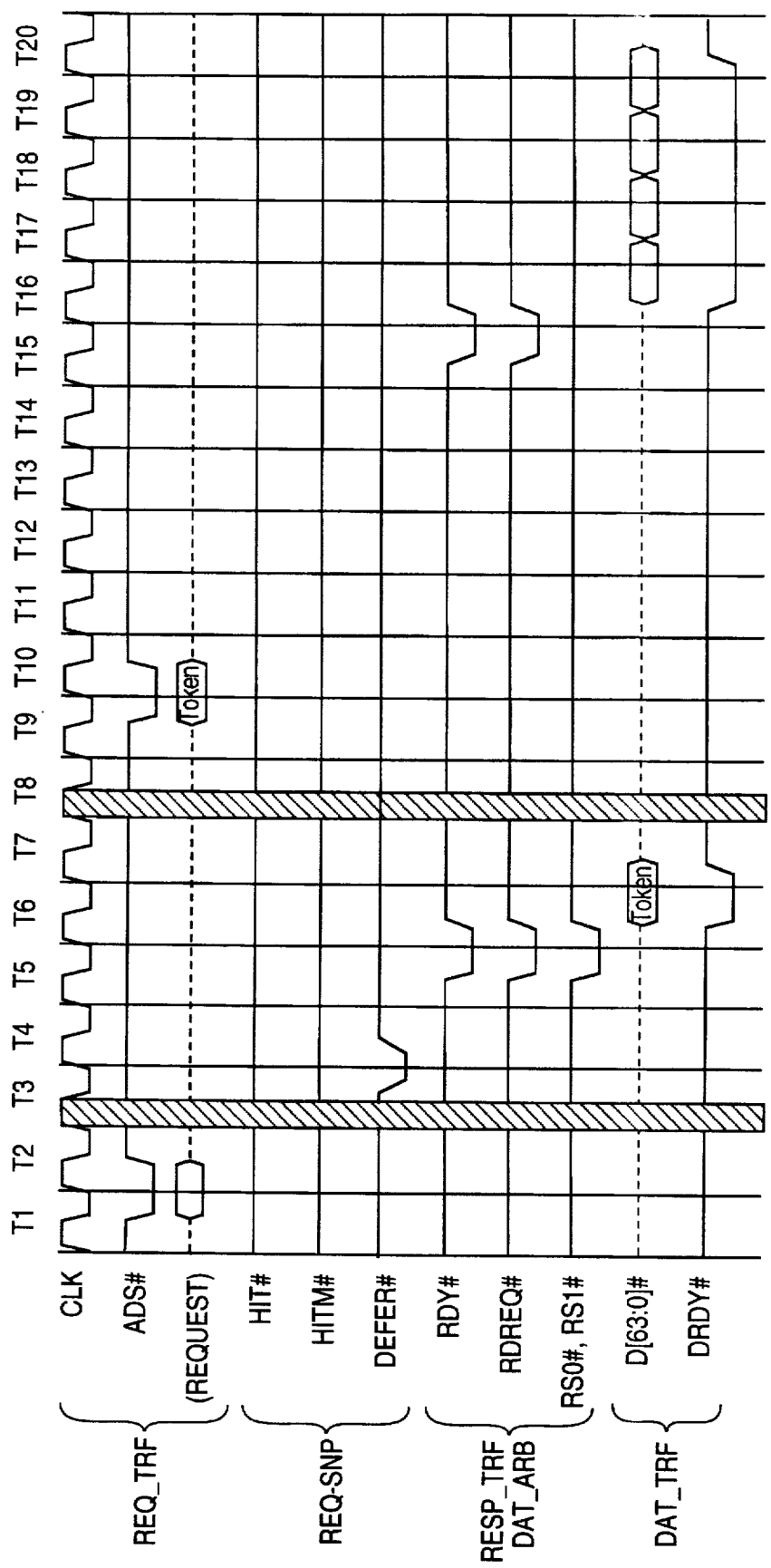
FIG. 4 is a timing diagram of depicting a deferred response according to the present invention.

FIG. 4 illustrates a deferred response followed by the corresponding Deferred Read Reply transaction. Referring to FIG. 4, in T1, the requesting agent asserts the ADS# signal indicating that a valid bus definition and address is on the request bus. Also in T1, the requesting agent drives the {REQUEST} group to issue a Read Line request. In the Snoop Result Phase, the addressed agent determines that the transaction cannot be completed in-order and hence asserts the DEFER# signal. In T5, the addressed agent becomes the responding agent due to deassertion of the HITM# signal and returns a deferred response by asserting the RDY#, RDREQ#, RS0#, and RS1 # signals. The RDY# signal is activated by a responding agent responding to a request. The RDREQ#, RS0# and RS1 # signals are used to encode different types of responses, including a deferred response. When the RDREQ# signal is active, it indicates that a token is on the data bus. In T6, the responding agent drives the deferred reply ID on the data bus. In the present invention, the DEFER# signal is asserted in the transaction's Snoop Result Phase.

In T10, the requesting agent observes the Deferred Read Reply transaction. The requesting agent matches the deferred reply ID to the ID stored with the original request in its transactions pending queue. In T16, the responding agent returns a successful completion response with data on the bus and transfers data during T17–T20. In T21, the entire deferred operation is complete.

In the currently preferred embodiment, a memory agent or I/O agent in the computer system is allowed to return a "deferred" response on any request other than a bus locked request, a deferred reply, or a cache line write designated for explicit writeback.

Receiving a deferred response removes the transaction from the In-Order Queue. The responding agent is responsible for supplying a deferred reply ID in the transaction's Data Transfer Phase. In order to complete the original request, the responding agent initiates a new transaction on the bus. This transaction is defined as a Deferred Reply transaction. The deferred reply ID, returned in the original transaction's Data Transfer Phase, is used as the address in the Deferred Reply transaction's Request Transfer Phase.

A deferred reply ID contains eight bits, divided into two four-bit fields. The deferred reply ID is returned on D[15:8]# in the original transaction's Data Transfer Phase. D[15:12]# contain the response agent ID, which is unique for every responding agent. D[11:8]# contain a reply ID, assigned by the response agent based on its internal queue. Up to twelve different responding agents may return deferred responses (twelve because agent IDs 0–3 are reserved for the processor(s) of the present invention). Up to sixteen deferred replies may be pending for each of the twelve agents. An agent that supports more than sixteen outstanding deferred replies can use multiple agent IDs.

In a Deferred Reply transaction's Request Transfer Phase, the deferred reply ID is driven on A[15:8]#. During the Response Phase, the transaction completion response is driven along with any data during data transfer phase.

Defer Agent Embodiments

In the currently preferred embodiment, one agent will be the memory agent or I/O agent in a deferred operation.

If a caching memory controller, such as L3 cache controller 110, is in the computer system, the cache controller may also generate the deferred responses and tokens on read operations when the read data is not immediately available in the cache. The cache controller will then proceed to obtain the data from the memory, such as main memory 121, while servicing any subsequent requests for data available in the cache memory. When the read response is ready, the cache controller arbitrates for the bus and returns the read data.

If an I/O bridge is in the computer system, the I/O bridge splits bus transactions. It should be noted that this is typically performed according to an I/O bus standard, such as the PCI EISA, ISA, MCA, PCMCIA, VESA standard. Generally, accesses to devices residing on the I/O bus take longer to complete than accesses issued to the memory devices. In a highly pipelined bus involving requests generated from multiple requesting agents, there is an intermix of I/O operations and memory operations. In order to eliminate the stalling effect of I/O accesses in subsequent memory accesses, the I/O bridge of the present invention generates a deferred/out of order response to accesses directed towards itself (and the devices on the I/O bus). In one embodiment, the I/O bridge of the present invention has the hardware necessary for deferring up to four bus transactions. When the response is ready, the I/O bridge arbitrates for the bus and initiates a deferred reply.

Token Generation and Recognition Hardware

In the present invention, each of the requesting and responding agents supports additional functionality in order to utilize the deferred protocol. In the present invention, the deferred response agents function as a bus master. Being a bus master according to the present invention consists of the ability to arbitrate for the bus and carry out a request transfer cycle. This is required because without the ability to be a bus master, the response agent could not obtain control of the bus when the data was ready subsequent to the responding agent giving a deferred response. For instance, the processors are bus masters generally. On the other hand, memory controllers generally are not bus masters and, thus, would need to have this ability to employ the token generation and recognition hardware of the present invention.

In one embodiment, token generation is the responsibility of the responding agent. A request cycle occurs in the system. After the ownership of the request is resolved, the token may be returned as part of the response to a requested cycle (depending on whether the data or completion signals requested are available).

Figure 5:
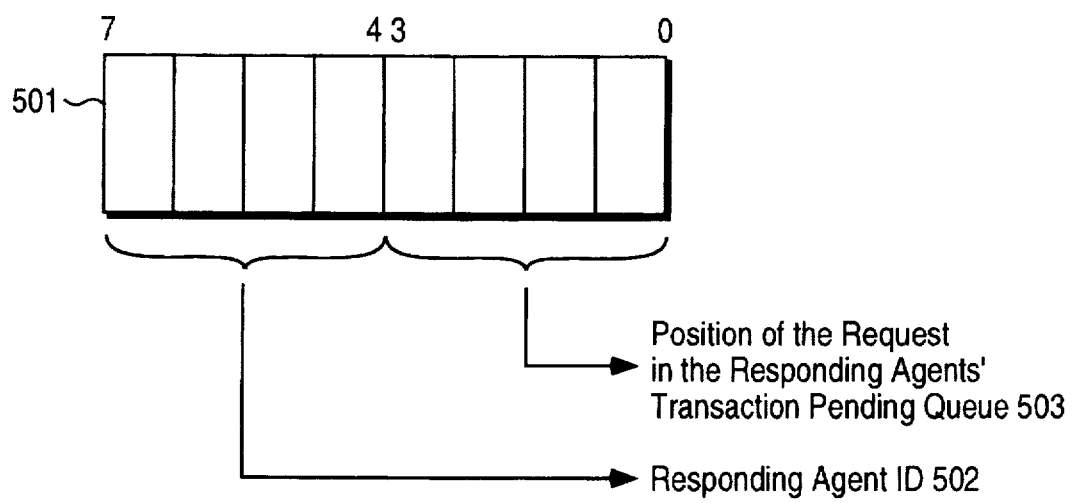
FIG. 5 illustrates an 8-bit token of the present invention.

One embodiment of a token of the present invention is shown in FIG. 5. Referring to FIG. 5, token 501 is comprised of eight bits divided between two components: a position ID 502 indicating the position of the response in the internal queue of the responding agent and a responding agent ID 503 indicating the source of the deferred reply. The responding agent ID is comprised of four bits. The responding agent ID may be comprised of more or less than four bits. For instance, the responding agent ID may be a 3-bit ID. The number of bits used to represent the ID of the responding agent indicates the maximum number of responding agents in the computer system that may generate deferred responses. For example, by using four bits for the ID, sixteen deferred responding agents may exist on the system bus.

As shown in FIG. 5, the number of bits used to indicate the position of the request in the transaction pending queue of the responding agent comprises of four bits. The position of the request may be described using more or less than four bits. For instance, the request position may be a 2-bit number. The number of bits used to describe the position of the request indicates the size of the transaction pending queue. For example, using four bits for the position request indicates that the transaction pending queue is capable of having a maximum of 16 separately addressable entries.

Figure 6:
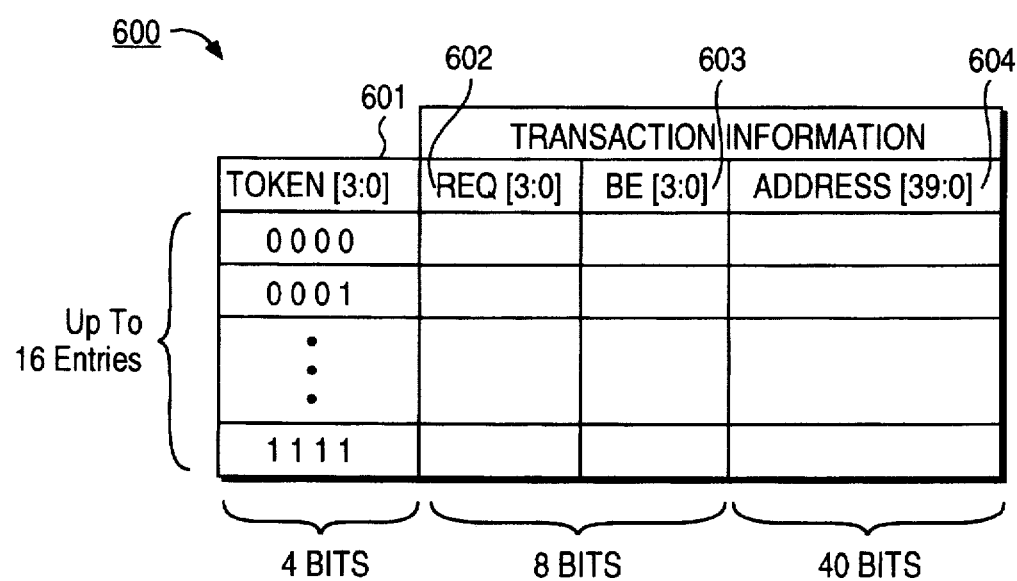
FIG. 6 illustrates one embodiment of the transaction pending queue in the receiving agent.

A responding agent that gives a deferred response maintains an internal deferred reply pool with up to 16 (1 to 16) entries. In the present invention, only a small queue depth (less than 16) is sufficient since the comparison hardware need support only the entries that are actually deferred. One embodiment of a transaction pending queue in a responding agent is shown in FIG. 6. Referring to FIG. 6, transaction pending queue 700 is shown having multiple entries, wherein each entry includes multiple fields. In one embodiment, queue 600 is a 16 entry queue. In the present invention, each entry row has a token field 601, a request field (REQ) 602, a byte enable (BE) field 603 and an address field 604. REQ field 602, BE field 603 and address field 604 represent the transaction information corresponding to each token in token field 601 in queue 600. REQ field 602 stores the type of request. BE field 603 stores the byte enable information that is used in further qualifying the request. Address field 604 stores the address. In one embodiment, token field 601 comprises four bits, REQ field 602 comprises four bits, BE field 603 comprises four bits, and address field 604 comprises 40 bits.

At the time the responding agent wishes to provide a deferred response, the responding agent assigns an entry for the transaction in the deferred reply pool and returns a token on the data bus. In the assigned entry in queue 600, the request is stored in the REQ, BE, and Address fields. After the transactions is complete, the responding agent becomes a request bus owner and initiates a deferred reply transaction. The responding agent also reclaims free queue entries and free response IDs in the deferred reply pool.

The responding agents of the present invention include logic for managing the token queue and for token generation. In one embodiment, the responding agent is able to take appropriate action on the new request of the bus while the suspended entries are being processed. In the present invention, the responding agent has the capability to compare the address of the new request against the address of a suspended entry in the transaction pending queue. In one embodiment, each agent includes 16×48 bit latches and 16×48 bit comparators to compare the address of the request to addresses stored in the transactions pending queue of the responding agent. The size of the comparators may be reduced, such that only the lower bits in the address are compared. On a positive match, the responding agent may abort the new request to avoid any conflict with the suspended request.

In the present invention, the requesting agents are capable of accepting and comprehending the deferred responses (i.e., the deferred response/token combination and the deferred reply/data combination). In the present invention, the requesting agents are also capable of taking the appropriate action(s) in response to the deferred responses. This action involves an ability to temporarily suspend the bus transaction.

Figure 7:
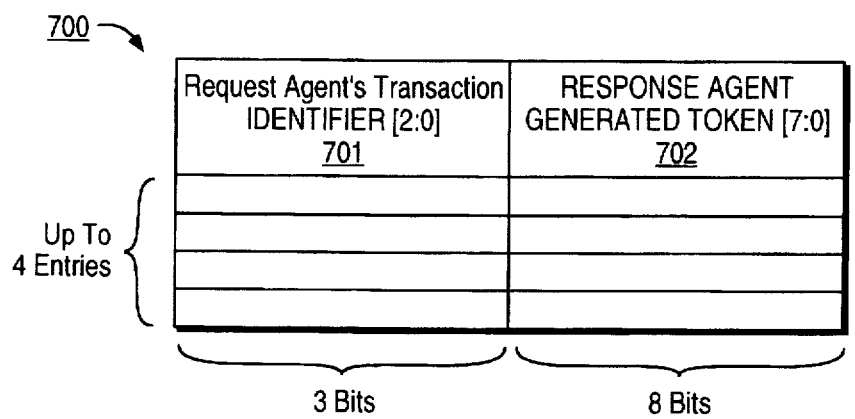
FIG. 7 illustrates one embodiment of the transaction pending queue requesting agent.

In the currently preferred embodiment, the requesting agents assumes that every outstanding transaction issue in the Request Transfer Phase may receive a deferred response. In the currently preferred embodiment, each requesting agent includes a queue to temporarily store suspended request IDs. Therefore, the requesting agents maintain an internal outstanding transaction queue with the same size as its ability to pipeline new requests. One embodiment of the transaction pending queue is shown in FIG. 7. Referring to FIG. 7, queue 700 is shown having four entries, where each entry is comprised of 11 bits which include a requesting agent's transaction identifier field 701 and a field for the responding agent's generated token 702. The number of bits used to represent the identifiers limits the number of designed entries in queue 700. In one embodiment, the identifier is comprised of three bits, but may be comprised of as many bits as necessary to support the total number of entries in queue 700. The generated token field 702 is comprised of 8-bits for storing a token received from the data bus.

On observing a deferred response, the requesting agent stores the token (i.e., deferred reply ID) supplied by the responding agent in the generated token field 702 in outstanding transaction queue 700. The requesting agents also have the ability to release the bus after it received an out-of-order response.

The requesting agent also includes matching hardware for matching the returned data to the appropriate request using the returned token. During the deferred reply transaction, the requesting agent matches the reply address with all deferred reply IDs in its outstanding transaction queue. On an ID match, the requesting agent can discard the original transaction from its outstanding transaction queue and complete the operation.

Figure 8:
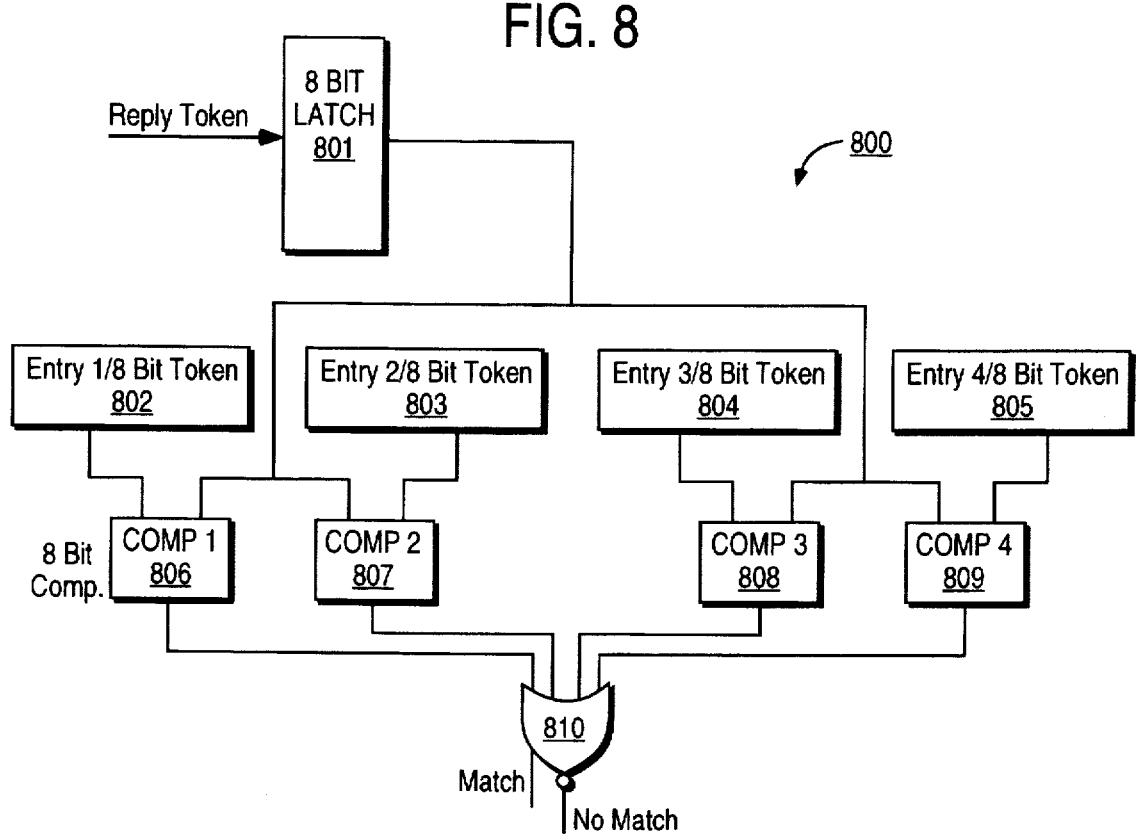
FIG. 8 is a block diagram of one embodiment of the token matching hardware of the requesting agent.

In one embodiment, each requesting agent includes comparator logic to perform the matching. In one embodiment, the comparator logic is comprised of 8-bit comparators for performing the matching and control logic for identifying the match and returning data to internal units with their interval tags. An example of the matching hardware is shown in FIG. 8. Referring to FIG. 8, matching hardware 800 comprises latch 801, latches 802–805 for storing the tokens received as deferred responses, comparators 806–809 for comparing the tokens received as deferred responses with the reply token, and NOR gate logic 810. Latch 801 is coupled to receive the reply token. The output of latch 801 is coupled to one input of each of comparators 806–809. The other input of each of the latches 802–805 is coupled to the output of latches 802–805 respectively. The outputs of each of comparators 806–809 are coupled to the inputs of NOR gate logic 810.

In one embodiment, latch 801 comprises an 8-bit latch which receives the reply token from the address bus. Latch 801 is sized according to the number of bits in the reply token. Latch 801 supplies the reply token to each of comparators 806–809. Each of the tokens stored in the transaction pending queue of the requesting agent are supplied to the comparators 806–909 via latches 802–805. Latches 802–805 are sized according to the number of bits in the tokens. Each of comparators 806–809 compare the reply token to one of the stored tokens. If the reply token matches a token stored in the transactions pending queue, one of comparators 806–809 produces a high output. If the reply token does not match a token stored in the transactions pending queue, none of comparators 806–809 produces a high output. If none of the outputs from comparators 806–809 is high, then the No Match output of NOR gate logic 810 is high, thereby indicating that the reply token does not correspond to a suspended response in the requesting agent. If one output from comparators 806–809 is high, then the match output of NOR gate logic 810 is high, thereby indicating that the reply token corresponds to a suspended response in the requesting agent. In response to a match, the requesting agent latches the data on the data bus or receives the completion signals. Corresponding to the original request.

Although in one embodiment the token is 8-bits, the present invention could use the request address as part or all of the token. One embodiment of the token using the address is shown in FIG. 9. Referring to FIG. 9, token 900 includes three fields: request 903, byte enable 902 and address 901. In one embodiment, the request field 903 comprises four bits, the byte enable field 902 comprises four bits, and address field 901 comprises 40-bits. The request field 903 represents the request that was issued by the requesting agent. The request modifier field 902 contains information modifying the request. The address field 901 contains the address of the request. The responding agent returns token 900 in the same manner as the token depicted in FIG. 5.

One advantage in this embodiment is that it recognizes the fact that any token definition may be either too constraining or too expensive due to different requirements of specific applications. When a new token definition is made, the number of bits in the token definition must be fixed. Depending on the scheme chosen, this, in turn, limits both the number of request/response agents that can be supported on the bus and the number of requests that can be supported per agent. Regardless of the scheme chosen for some specific application, it may not be too constraining. Thus, using an address as a token would mean that no artificial limitations are introduced. Secondly, the use of no token takes into account the fact that for highest performance, a full address comparison is desired for a new request with all the entries in the suspended queue. This is in addition to the token matching required for the out-of-order responses.

By using the address as a token, the original requesting agent simply snoops on the address and compares it with its internal suspended entry queue. The response-initiated cycle is run in the same manner with the exception of clearly marking the address as returning from a deferred reply in the command field. This allows the proper differentiation necessitated for deferred replies from normal requests.

The responding agents maintain an internal transaction queue similar to that shown in FIG. 6. One embodiment of the transaction pending queue is shown in FIG. 10. Referring to FIG. 10, queue 1000 is shown as having sixteen entries, where each entry is comprised of 48-bits which include a request (REQ) field 1001, a bus enable (BE) field 1002, and an address field 1003. In one embodiment, the REQ field comprises four bits, the BE field comprises four bits, and the address field comprises 40 bits. Queue 1000 stores the same information as the queue depicted in FIG. 6 with the exception that a separate field for the token is not needed since the address is already stored.

Figure 11:
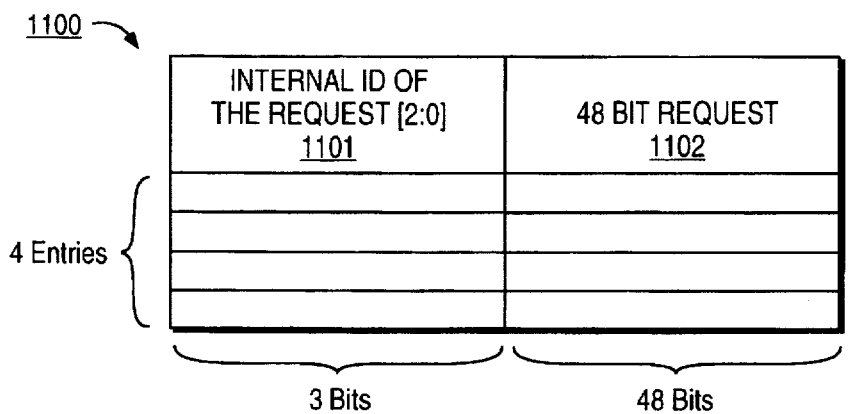
FIG. 11 illustrates one embodiment of the transaction pending queue in the requesting agent.

In this embodiment, the requesting agent is responsible for releasing the bus after a deferred response. Using the address as a token, the requesting agents still maintains an internal outstanding transaction queue with the same size as its ability to pipeline new requests. One embodiment of the transaction pending queue is shown in FIG. 11. Referring to FIG. 11, queue 1100 is shown having four entries, where each entry is comprised of 50 bits which include a requesting agent's internal identifier (ID) field 1101 and a field for the 48-bit request 1102. The number of bits used to represent the ID limits the number of entries in queue 1100. In one embodiment, the identifier is comprised of three bits, but may be comprised of as many bits as necessary to support the total number of entries in queue 1100. The generated token field 1102 is comprised of the 48-bit request, including the address of the request. On observing a deferred response, the requesting agent stores the address request (i.e., deferred reply ID) supplied by the responding agent in the 48-bit request field 1102 in outstanding transaction queue 1100.

The requesting agent also includes matching hardware for matching the returned data to the appropriate request using the returned token. During the deferred reply transaction, the requesting agent matches the reply address with all deferred reply IDs in its outstanding transaction queue. On an ID match, the requesting agent can discard the original transaction from its outstanding transaction queue and complete the operation.

Figure 12:
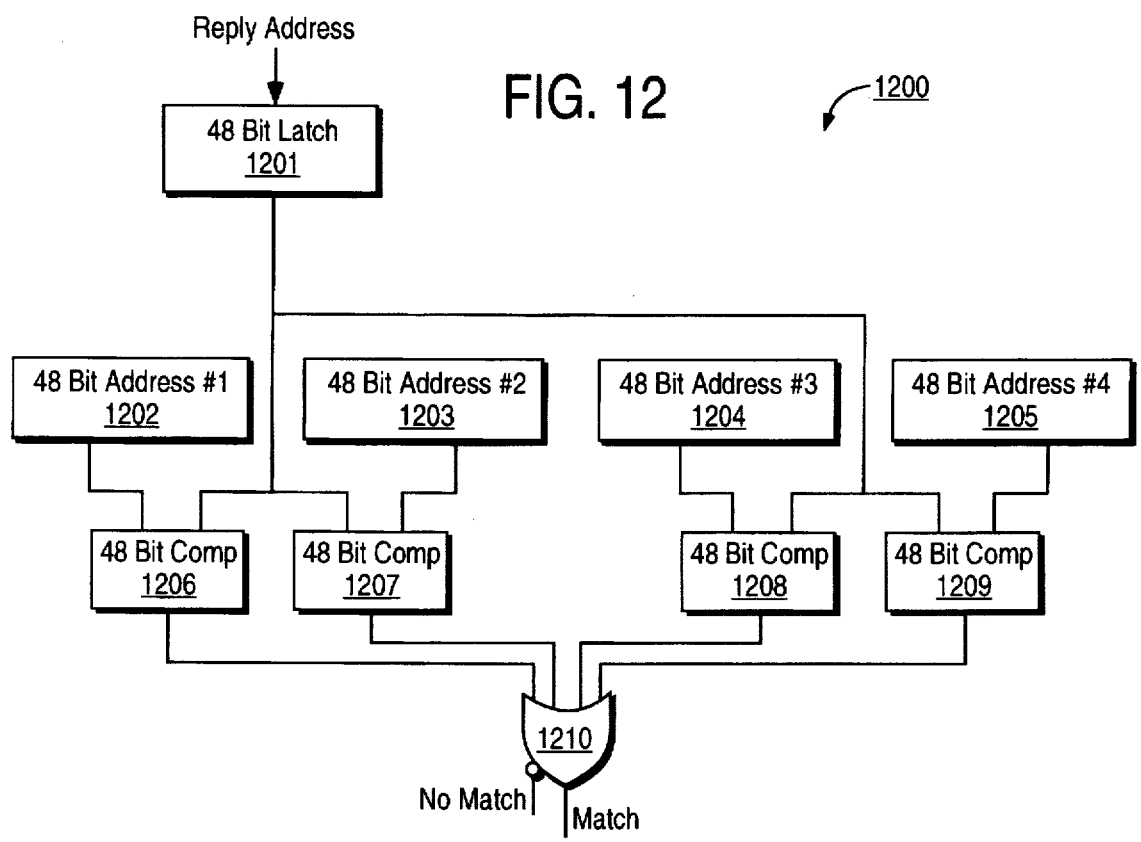
FIG. 12 illustrates one embodiment of the token matching hardware in the requesting agent.

In this embodiment, the requesting agent uses 48-bit latches and a 48-bit comparator per latch to perform the matching. In one embodiment, the comparator logic includes control logic for identifying the match and returning data to internal units with their internal tags. An example of the matching hardware is shown in FIG. 12. Referring to FIG. 12, matching hardware 1200 comprises latch 1201, latches 1202–1205 for storing the tokens received as deferred responses, comparators 1206–1209 for comparing the tokens received as deferred responses with the reply token, and NOR gate logic 1210. Latch 1201 is coupled to receive the reply token. The output of latch 1201 is coupled to one input of each of comparators 1206–1209. The other input of each of the comparators 1206–1209 is coupled to the output of latches 1202–1205 respectively. The outputs of each of comparators 1206–1209 are coupled to the inputs of NOR gate logic 1210.

In one embodiment, latch 1201 comprises an 48-bit latch which receives the reply address from the address bus. Latch 1201 is sized according to the number of bits in the reply address. Latch 1201 supplies the reply address to each of comparators 1206–1209. Each of the request addresses stored in the transaction pending queue of the requesting agent are supplied to the comparators 1206–1209 via latches 1202–1205. Latches 1202–1205 are sized according to the number of bits in each request address. Each of comparators 1206–1209 compare the reply address to one of the stored addresses. If the reply address matches a request address stored in the transactions pending queue, one of comparators 1206–1209 produces a high output. If the reply address does not match a request address stored in the transactions pending queue, none of comparators 1206–1209 produces a high output. If one output from comparators 1206–1209 is high, then the match output of NOR gate logic 1210 is high, thereby indicating that the reply address corresponds to a suspended response in the requesting agent. If none of the outputs from comparators 1206–1209 is high, then the No Match output of NOR gate logic 1210 is high, thereby indicating that the reply address does not correspond to a suspended response in the requesting agent. Additional control logic would also be used to take appropriate action on a match.

When the address is used as part of the token, the responding agent generates a deferred response with no need for generating a token. During the reply phase, the responding agent must also arbitrate for the bus and run a cycle with the requested data and the original address. In one embodiment, the responding agent includes a 48-bit address bus driver to facilitate the sending of the address.

Note that this embodiment is advantageous in that no new pins or token specifications are required. Note also that in this embodiment, the responding agents still have the overhead of full 48-bit address comparison.

I This logic overhead may be acceptable for both the processor and a caching I/O bridge where the existing snooping logic can be reused.

Token Management and the Processor of the Present Invention

The microprocessor of the present invention performs speculative and out-of-order execution. This implies that the microengine of the processor continues execution beyond missing data references. After the access is verified as a miss within the cache of the microprocessor and the backside cache, the request is sent to the system bus. A long latency access can be optimally satisfied by returning a split cycle response (i.e., a token) to the microprocessor to free up the microprocessor bus. In this manner, the microprocessor can continue additional data transfers.

The split cycle response capability of the system bus can be exploited by the external subsystems. For instance, the L3 cache may return an out-of-order response on a cache miss and a normal in order response on a cache hit. The L3 cache controller continues to access externally and completes the split transaction after the data is received. In the meantime, the processor-to-L3 cache data transfers continue. Also, a memory controller may return an out-of-order response on a page miss requiring a full RAS precharge cycle or during an ongoing refresh cycle, such that on a page hit a normal in order response can be satisfied immediately. This will free up the microprocessor bus to continue data transfers between the microprocessor and other memory controllers and write back caches.

The present invention also is advantageous to any access from the processor to the I/O bridge. Because accesses from the processor to the I/O bridge would involve a long latency as compared with other memory elements directly resident on the processor bus, all I/O bridge accesses from the processor may be given a deferred response resulting in a substantial improvement in processor bandwidth availability.

The present invention also allows an external snoop access to the processor of the present invention resulting in a modified data hit may be given an out-of-order response to free up the processor bus for further snoop traffic. This also allows other processes coexisting on the bus to continue using the bus while the processor prepares itself to perform a write back cycle.

In the present invention, a bus transaction occurs in a normal pipelined manner with addresses being driven onto the address bus and data being returned on the data bus. When a split bus transaction occurs, a deferred response may be generated. The present invention reuses the existing bus architecture to indicate that the access is deferred type of access. In other words, in the present invention, when a responding agent prefers to not respond to its request in a pipelined manner, a deferred response is made and a token is sent on the data bus instead of the requested data. In this manner, the token maintains the relationship between the requesting agent and the responding agent. When a requesting agent is waiting for a normal response, the requesting agent recognizes that a token is returning and not a normal response. Thus, by allowing the token to be sent on the data bus, no additional hardware, such as a separate token bus, is required. In this manner, the present invention allows for split transactions to occur without any increase in the number of pins. In fact, because separate token buses are not required for the request and response paths, the present invention reduces the number of pins required by each package to perform split bus transactions.

In the present invention, the responsibility for token management is placed on the responding agent. The responding agent is responsible for supplying the token and the deferred response at the appropriate, or proper, time. In the present invention, only those units designed to use the token use them. The computer system could include other response agents, such as a memory controller, which only produce in-order response and not create deferred responses. These "in-order" agents always return data in a pipelined manner. Thus, the present invention allows design of simpler in-order response agents with zero logic burden in the presence of other agents capable of generating deferred responses.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for performing split bus transactions in a computer system has been described.

We claim:

1. A method for performing bus transaction in a computer system having an address bus and a data bus that allow a plurality of bus transactions to be performed in a pipelined manner, the method comprising steps of:

initiating a bus request as part of a bus operation, wherein the step of initiating a bus request comprises driving an address on the address bus, wherein the step of driving the address is performed by a first agent;

driving a first token on the data bus in response to the address, wherein the step of driving a first token is performed by a second agent;

receiving the first token from the data bus, wherein the first token is received by the first agent;

driving a second token on the address bus, wherein the second token is driven by the second agent;

sending a deferred reply, wherein the deferred reply is sent by the second agent;

receiving the second token from the address bus, wherein the second token is received by the first agent, such that the first agent identifies the second token as corresponding to the address; and receiving the deferred reply to complete the bus operation, wherein the deferred reply is received by the first agent after identifying the second token as corresponding to the bus request.

2. The method as defined in claim 1 wherein the second token is the same as the first token, such that the first agent identifies the second token as corresponding the address by comprising the first token and the second token to determine if the token and the second token are the same.

3. The method as defined in claim 1 wherein the step of driving the first token comprises driving the first token when requested data is not ready.

4. The method as defined in claim 1 wherein the step of driving the data occurs after requested data is ready.

5. The method defined in claim 1 wherein the step of sending the deferred reply comprises sending at least one completion signal to the first agent.

6. The method defined in claim 1 wherein the step of sending the deferred reply comprises driving data on the data bus.

7. A method for performing bus transactions in a computer system having an address bus and a data bus that allow a plurality of bus transactions to be performed in a pipelined manner, the method comprising steps of:

initiating a bus request as part of a bus operation wherein the step of initiating a bus request comprises driving an address on the address bus, wherein the step of driving the address is performed by a first agent;

driving a first token on the data bus in response to the address if a second agent is unable to complete the bus operation, wherein the step of driving a first token is performed by a second agent;

receiving the first token from the data bus, wherein the first token is received by the first agent;

driving a second token on the address bus, wherein the second token is driven by the second agent;

sending a deferred reply, wherein the deferred reply is sent by the second agent;

receiving the second token from the address bus, wherein the second token is received by the first agent;

comparing the second token to the first token; and latching the deferred reply wherein the deferred reply is received by the first agent if the second token and the first token match, such that the bus operation is complete.

8. The method as defined in claim 7 wherein the first token comprises the address.

9. The method defined in claim 7 wherein the step of sending the deferred reply comprises sending at least one completion signal to the first agent.

10. The method defined in claim 7 wherein the step of sending the deferred reply comprises driving data on the data bus.

11. A computer system comprising:

a first bus means for communicating address information;

a second bus means for communicating data information;

at least one requesting agent coupled to the first bus and the second bus, wherein said at least one requesting agent is capable of initiating a bus operation;

at least one responding agent coupled to the first bus means and the second bus means, wherein said at least one responding agent is capable of responding to a request from said at least one requesting agent, such that a response is sent on the second bus means in response to said request;

wherein said at least one responding agent drives a first token on the second bus means as its response when said at least one responding agent is not ready to fulfill the bus request, and wherein said at least one requesting agent receives the first token from the second bus means, and wherein said at least one responding agent drives a second token on the first bus means and a deferred reply when ready to fulfill the bus request, wherein said at least one requesting agent receives the second token from the first bus means, and further wherein the second token is identified by said at least one requesting agent as corresponding to the bus request, such that said at least one requesting agent latches the deferred reply to complete the bus transaction.

12. The computer system as defined in claim 7 wherein the first bus means comprises an address bus and the second bus means comprises a data bus.

13. The computer system as defined in claim 7 wherein said at least one responding agent is not ready to respond to the bus request because data corresponding to the request is not available.

14. A method for performing bus transactions in a computer system having an address bus and a data bus that allow a plurality of bus transactions to be performed in a pipelined manner, the method comprising steps of:

driving an address on the address bus, wherein the step of driving the address is performed by a first agent;

sending a deferred response in response to the address, wherein the step of sending a deferred response is performed by a second agent;

receiving the deferred response, wherein the deferred response is received by the first agent;

sending a deferred reply, wherein the deferred reply is sent by the second agent;

driving data corresponding to the address on the data bus, wherein the data is driven by the second agent;

receiving the deferred reply, wherein the deferred reply is received by the first agent, such that the first agent identifies the deferred reply as corresponding to the address; and receiving the data from the data bus, wherein the data is received by the first agent after identifying the deferred reply as corresponding to the address.

15. The method as defined in claim 14 wherein the step of sending a deferred response includes the step of driving a first token on the data bus in response to the address, wherein the step of driving a first token is performed by a second agent, such that the token becomes one of a series of responses on the data bus, and wherein the series of responses is ordered in the same order as the series of addresses; and wherein the step of receiving the deferred response includes the step of receiving the first token from the data bus, wherein the first token is received by the first agent.

16. The method as defined in claim 14 wherein the step of sending a deferred reply includes the step of driving a second token on the address bus, wherein the second token is driven by the second agent; and wherein the step of receiving the deferred reply includes the step of receiving the second token from the address bus, wherein the second token is received by the first agent, such that the first agent identifies the second token as corresponding to the address.

17. A method for performing bus transactions in a computer system having an address bus and a data bus that allow a plurality of bus transactions to be performed in a pipelined manner, the method comprising steps of:

driving an address on the address bus, wherein the step of driving the address is performed by a first agent;

driving a first token on the data bus;

driving a deferred response, wherein the first token and the deferred response are sent in response to the address and are performed by a second agent;

receiving the first token from the data bus;

receiving the deferred response, wherein the first token and the deferred response are received by the first agent;

sending a deferred reply;

driving a second token on the address bus, wherein the deferred reply and the second token are sent by the second agent;

driving data on the data bus, wherein the data is driven by the second agent;

receiving the deferred reply;

receiving the second token from the address bus, wherein the deferred reply and the second token are received by the first agent, such that the first agent identifies the second token as corresponding to the address; and receiving the data from the data bus, wherein the data is received by the first agent after identifying the second token as corresponding to the address.

18. The method as defined in claim 17 wherein the second token is the same as the first token, such that the first agent identifies the second token as corresponding to the address by comparing the first token and the second token to determine if the first and the second token are the same.

19. The method as defined in claim 17 wherein the step of driving the first token on the data bus comprises driving the address on the data bus.

20. A method for performing bus transactions in a computer system having an address bus and a data bus that allows a plurality of bus transactions to be performed in a pipelined manner, the method comprising steps of:

driving an address on the address bus as part of a bus request of a first bus transaction, wherein the step of driving the address is performed by a first agent;

sending a first token on the data bus and a deferral response in response to the request, wherein the step of sending is performed by a second agent;

receiving the deferral response and the first token to complete the first bus transaction, wherein the deferral response and first token are received by the first agent;

sending a second token on the address bus and a deferred reply as part of a second bus transaction, wherein the deferred reply is sent by the second agent; and identifying the deferred reply as corresponding to the request, wherein the step of identifying comprises the first agent receiving the deferred reply to complete the second bus transaction, such that the request is completed in two bus transactions.

21. The method defined in claim 20 wherein the step of identifying includes comparing the first token and the second token and receiving the deferred reply if the first token and the second match.

22. The method defined in claim 20 further comprising the step of buffering the address and the first token for use as a reference when receiving the deferred reply.

23. A method for performing bus transactions in a computer system having an address bus and a data bus that allow a plurality of bus transactions to be performed in a pipelined, manner, the method comprising steps of:

driving an address on the address bus, wherein the step of driving the address is performed by a first agent;

driving a token on the data bus, wherein the step of driving is performed by a second agent;

driving a deferral response in response to the address, wherein the step of driving the deferral response is performed by a second agent;

receiving the token from the data bus, wherein the token is received by the first agent;

receiving the deferral response, wherein the deferral response is received by the first agent to complete a first bus transaction;

sending a deferred reply as part of a second bus transaction;

resending the token on the address bus, wherein the deferred reply and the token are sent by the second agent;

receiving the token from the address bus, wherein the token are received by the first agent; and receiving the deferral reply to complete a second bus transaction.

24. The method defined in claim 23 wherein the first token comprises the address.

25. A computer system comprising:

an address bus;

a data bus;

a control bus;

a first bus agent coupled to the address bus, the data bus, and the control bus for performing a bus operation, wherein the first bus agent initiates the bus operation by initiating a first bus transaction by driving a request address of a request onto the address bus during a first clock cycle, and terminates the first bus transaction upon receiving an immediate response to satisfy the request or upon receiving a deferral response indication on the control bus indicating response to the request is to be deferred and request identification information on the data bus.

26. The computer system defined in claim 25 further comprising a second bus agent for providing the immediate response to the first bus agent.

27. The computer system defined in claim 26 wherein the second bus agent performs a second bus transaction, wherein the second bus agent initiates the second bus transaction by driving the request identification information onto the address bus and by driving a deferral reply.

28. The computer system deferred in claim 27 wherein the first bus agent received the request identification information deferred reply and associates the deferred reply with the request on the first bus transaction to complete the bus operation.

29. The computer system defined in claim 28 wherein the first bus agent associates the deferred reply with the request using the request identification information.

30. The computer system defined in claim 25 further comprising a second bus for providing the deferral response to the first but agent.

31. The computer system defined in claim 25 wherein the request identification information comprises a token.

32. A method of performing bus transactions in a computer system having a requesting agent and a responding agent each coupled to a bus which includes a response bus, on address bus, and a data bus, wherein the bus is ordered and pipelined such that each bus transaction has a predetermined response phase and such that the bus transactions complete in a same order in which requested, the method comprising the steps of:

the requesting agent requesting a first bus transaction by issuing an address onto the address bus; and if the responding agent is ready to complete the first bus transaction, the responding agent driving an in-order completion response onto the response bus in a response phase of the first bus transaction; and if the responding agent is not ready to complete the first bus transaction, then the responding agent driving a deferral response onto the response bus in the response phase of the first bus transaction and a token on the data bus, and when the responding agent becomes ready to respond, then the responding agent initiating a second bus transaction and driving the token onto the address bus, a deferred reply and any requested data onto the data bus, in a response phase of the second bus transaction.

33. A computer system comprising:

a bus including;
an address bus;
a response bus;
a data bus;

a requesting agent coupled to the bus, wherein the requesting agent issues a bus request on the address bus, handles deferral responses in response to requests, and maintains the bus request as pending until receiving a deferred reply; and a responding agent coupled to the bus, wherein the responding agent issues a token on the data bus and generates a deferral response when unable to complete a transaction during a predetermined time of the transaction, and generates the deferred reply and sends the token on the address bus when the responding agent is subsequently able to complete the transaction.

* * * * *

UNITED STATES PATENT AND TRADEMARK OFFICE
CERTIFICATE OF CORRECTION

PATENT NO. : 5,568,620
DATED : October 22, 1996
INVENTOR(S) : Sarangdhar, et. al.

It is certified that error appears in the above-indentified patent and that said Letters Patent is hereby corrected as shown below:

Title page, item [54] and col. 1, the tile should read as following:
   --METHOD AND APPARATUS FOR PERFORMING SPLIT BUS
TRANSACTIONS IN A COMPUTER SYSTEM USING TOKENS
TRANSFERRED ON ADDRESS AND DATA BASES--

Signed and Sealed this

First Day of July, 1997

*Attest:*

BRUCE LEHMAN

*Attesting Officer*    *Commissioner of Patents and Trademarks*